US011590895B2

(12) United States Patent
Brouwer et al.

(10) Patent No.: US 11,590,895 B2
(45) Date of Patent: Feb. 28, 2023

(54) ACTUATOR MECHANISM

(71) Applicant: MCi (Mirror Controls International) Netherlands B.V., Woerden (NL)

(72) Inventors: Stefan Fritz Brouwer, Schoonhoven (NL); Bastiaan Huijzers, Dordrecht (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 703 days.

(21) Appl. No.: 16/486,577

(22) PCT Filed: Feb. 20, 2018

(86) PCT No.: PCT/NL2018/050114
§ 371 (c)(1),
(2) Date: Aug. 16, 2019

(87) PCT Pub. No.: WO2018/156019
PCT Pub. Date: Aug. 30, 2018

(65) Prior Publication Data
US 2020/0148118 A1 May 14, 2020

(30) Foreign Application Priority Data
Feb. 21, 2017 (NL) ...................................... 2018400

(51) Int. Cl.
*B60R 1/072* (2006.01)
*G02B 7/182* (2021.01)
(Continued)

(52) U.S. Cl.
CPC .............. *B60R 1/072* (2013.01); *G02B 7/182* (2013.01); *H02K 7/1166* (2013.01); *F16H 1/16* (2013.01);
(Continued)

(58) Field of Classification Search
CPC ....... F16H 2025/209; F16H 2025/2084; F16H 25/20; F16H 1/16; H02K 7/1166; G02B 7/182; B60R 1/072
See application file for complete search history.

(56) References Cited

U.S. PATENT DOCUMENTS 4,594,539 A  6/1986  Michelson
5,598,386 A  1/1997  Shtipelman et al.
(Continued)

FOREIGN PATENT DOCUMENTS

JP      62283029 A    12/1987
JP    2004-066892 A    3/2004
(Continued)

*Primary Examiner* — David M Fenstermacher
(74) *Attorney, Agent, or Firm* — Volpe Koenig

(57) ABSTRACT

The invention relates to an actuator mechanism (1) for adjusting the orientation of a mirror element in an exterior mirror unit of a vehicle. The mechanism comprises an electric motor (9, 10) with a driving shaft (11, 12), a drive train (13, 14), and a movable mirror adjusting element (5, 6) coupled via the drive train to the driving shaft of the electric motor. Also, the actuator mechanism comprises an actuator frame (2) which carries the electric motor, the drive train and the mirror adjusting element. The driving shaft of the electric motor is bearing mounted in the actuator frame.

16 Claims, 3 Drawing Sheets

(51) Int. Cl.
*H02K 7/116* (2006.01)
*F16H 1/16* (2006.01)
*F16H 25/20* (2006.01)

(52) U.S. Cl.
CPC ........ *F16H 25/20* (2013.01); *F16H 2025/209* (2013.01); *F16H 2025/2084* (2013.01)

(56) References Cited

U.S. PATENT DOCUMENTS

| | | | |
|---|---|---|---|
| 5,938,166 A | 8/1999 | Seichter et al. | |
| 6,340,231 B1 | 1/2002 | Polzer | |
| 2005/0225886 A1* | 10/2005 | Yamada | B60R 1/072 |
| | | | 359/872 |
| 2007/0024996 A1* | 2/2007 | Iwasaki | B60R 1/072 |
| | | | 359/841 |
| 2008/0068734 A1 | 3/2008 | Fukai et al. | |
| 2012/0050901 A1* | 3/2012 | Tobin | B60R 1/072 |
| | | | 359/877 |
| 2012/0134040 A1* | 5/2012 | Kudo | B60R 1/072 |
| | | | 359/877 |
| 2013/0070358 A1 | 3/2013 | Suzuki | |
| 2013/0107386 A1* | 5/2013 | Sobecki | B60R 1/072 |
| | | | 359/877 |
| 2017/0158137 A1* | 6/2017 | Yoshida | B60R 1/072 |
| 2017/0282802 A1* | 10/2017 | Sugimura | B60R 1/072 |
| 2017/0282805 A1* | 10/2017 | Sugimura | B60R 1/025 |
| 2019/0202359 A1* | 7/2019 | Nakayama | B60R 1/04 |
| 2020/0148117 A1* | 5/2020 | Fujisaki | B60R 1/072 |
| 2020/0148118 A1* | 5/2020 | Brouwer | H02K 7/1166 |
| 2021/0253026 A1* | 8/2021 | Golm | G02B 1/18 |
| 2021/0261052 A1* | 8/2021 | Kawamura | B60R 1/072 |
| 2021/0323477 A1* | 10/2021 | LaCross | B60R 1/12 |
| 2022/0111729 A1* | 4/2022 | Shin | G02B 7/1821 |
| 2022/0161725 A1* | 5/2022 | Yu | H02K 7/1166 |

FOREIGN PATENT DOCUMENTS

| | | |
|---|---|---|
| JP | 2013-35467 A | 2/2013 |
| WO | 02/067648 A1 | 8/2002 |
| WO | 2011102381 A1 | 8/2011 |

* cited by examiner

ACTUATOR MECHANISM

CROSS REFERENCE TO RELATED APPLICATIONS

This application is a 35 USC § 371 National Stage application of International Patent Application No. PCT/NL2018/050114, which was filed Feb. 20, 2018, entitled "ACTUATOR MECHANISM" and Netherlands Patent Application No. 2018400, which was filed Feb. 21, 2017, and are incorporated herein by reference as if fully set forth.

This invention relates to an actuator mechanism for adjusting the orientation of a mirror element in an exterior mirror unit of a vehicle, comprising an electric motor with a driving shaft, a drive train, and a movable mirror adjusting element coupled via the drive train to the driving shaft of the electric motor, furthermore comprising an actuator frame which carries the electric motor, the drive train and the mirror adjusting element.

Actuator mechanisms for adjusting the orientation of a mirror element in an exterior mirror unit of a vehicle are frequently used in the assembly of vehicles such as passenger cars. The electric motor carried by the actuator frame drives with the driving shaft a drive train for adjusting a mirror adjusting element. Through interaction of the mirror adjusting element with the mirror element, the orientation of the mirror element can be adjusted in a controlled manner.

Because of the relatively high production numbers, there is an ongoing demand for miniaturization. Through more compact implementation, not only an advantage is to be achieved in material reduction, but also benefits may be realized in energy consumption and dynamic behavior.

An object of the invention is to provide a more compact actuator mechanism for adjusting the orientation of a mirror element in an exterior mirror unit of a vehicle. To this end, the invention provides an actuator mechanism for adjusting the orientation of a mirror element in an exterior mirror unit of a vehicle, comprising an electric motor with a driving shaft, a drive train, and a movable mirror adjusting element coupled via the drive train to the driving shaft of the electric motor, furthermore comprising an actuator frame which carries the electric motor, the drive train and the mirror adjusting element, wherein the driving shaft of the electric motor is bearing-mounted in the actuator frame.

By bearing-mounting the driving shaft of the electric motor in the actuator frame, the electric motor can be mounted in the frame in a compact manner, since bearings in a motor housing are thus redundant, so that less space is needed for the whole of electric motor and actuator frame.

When using two electric motors with associated drive train and mirror adjusting element to adjust a mirror adjusting element in two degrees of freedom, a double saving of space can be realized because both motors can be bearing-mounted directly in the actuator frame and hence can be implemented without bearings in a motor housing.

It is greatly preferred for the stator of a first electric motor to be integrated with the stator of a second electric motor in the actuator mechanism, so that constructional advantages can be gained, for example, by efficiently utilizing the flux of a single or a plurality of permanent magnets in the stator for both electric motors.

Further advantageous embodiments are represented in the subclaims.

It is noted that the above-described features may each individually be part of an actuator mechanism, i.e., isolated from the context in which they are described, separately from other features, in combination with only some of the other features described in the context in which the actuator mechanism is disclosed. Each of the features may furthermore be combined with every other feature described, in any combination.

The invention will be further elucidated on the basis of an exemplary embodiment of an actuator mechanism as shown in the drawing. In the drawing:

In the figures, like or corresponding parts are designated with the same reference numerals. It is noted that the figures are only shown by way of exemplary embodiment and should not be construed as limiting in any way.

FIG. 1 shows a schematic perspective view of an actuator mechanism 1 according to the invention. The actuator mechanism 1 is configured for adjusting the orientation of a mirror element in an exterior mirror unit of a vehicle such as a passenger car or truck.

Figure 1:
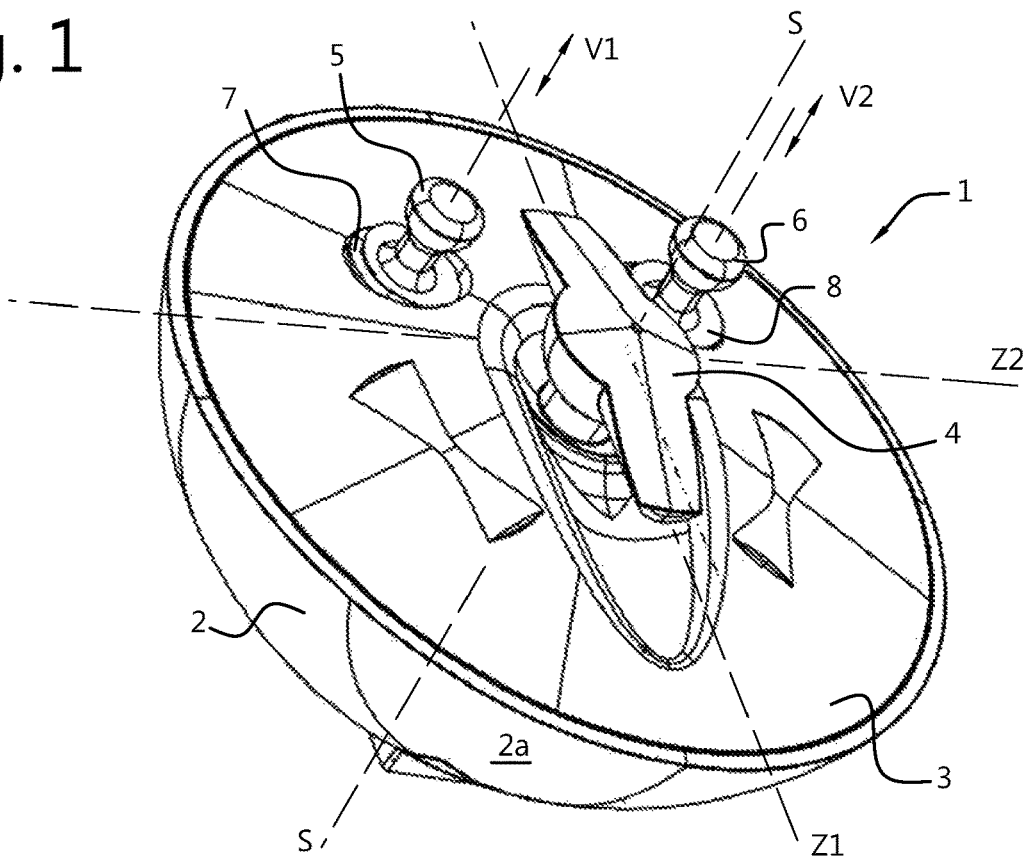
FIG. 1 shows a schematic perspective view of an actuator mechanism according to the invention.

The actuator mechanism 1 includes an actuator frame 2 which, in the embodiment shown, is configured to be substantially cup-shaped around an axis of symmetry S and which can be preferably detachably arranged in a likewise cup-shaped housing. The frame 2 is, for example, made from a plastic. Furthermore, the actuator mechanism 1 includes a cap or plate 3 which covers components inside the cup shape. Thus, the actuator frame 2 and the cap 3 form a substantially sealed unit for protection of the components received therein. Also, the actuator mechanism 1 includes a supporting element 4, set up outside the cap 3, on which a mirror element with mirror glass can be secured. The supporting element 4 is pivotable about a first and a second pivoting axis Z1, Z2, both substantially transverse to the axis of symmetry S of the cup-shaped actuator frame 2. The first and second pivoting axes Z1, Z2 are oriented, for example, mutually transversely. The actuator mechanism 1 also includes two mirror adjusting elements 5, 6 which extend outwards through openings 7, 8 in the cap 3. The mirror adjusting elements 5, 6 may also be attached to the mirror element. Via a mechanism described hereinafter, the mirror adjusting elements 5, 6 are each separately adjustable along a linear adjustment path V1, V2 which extends substantially parallel along the axis of symmetry S of the cup-shaped actuator frame 2. By adjustment of the mirror adjusting elements 5, 6, the orientation of the mirror element relative to the two pivoting axes Z1, Z2 can be set, to position the mirror element at a desired angle with respect to the axis of symmetry S, in two degrees of freedom.

In the embodiment shown, the supporting element 4 is central, at an axis of symmetry S of the cup-shaped actuator frame 2. However, in principle, the supporting element 4 may also be placed eccentrically relative to the axis of symmetry S. Also, a plurality of supporting elements may be used. In addition, the supporting element 4 may be rigidly secured to the actuator frame 2, with a tiltable coupling or point of support on the mirror element.

Figure 2A:
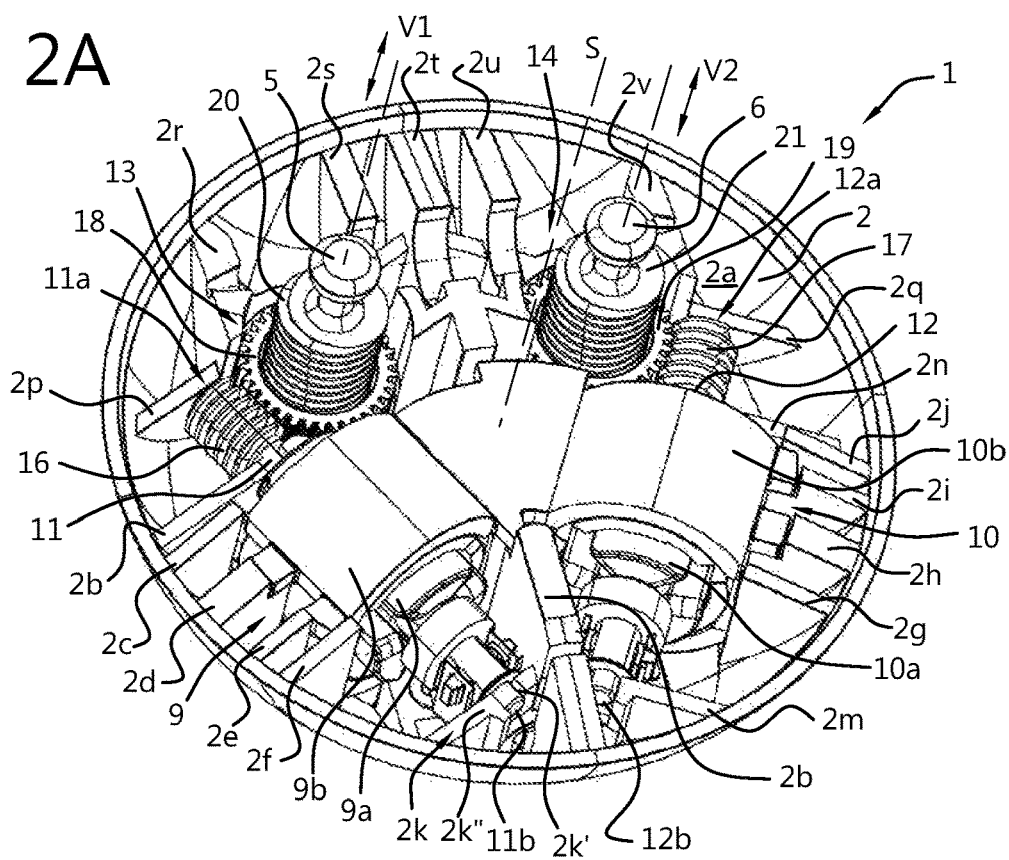
FIG. 2a shows a schematic perspective view of the actuator mechanism of FIG. 1 with cap removed.

FIG. 2a shows a schematic perspective view of the actuator mechanism of FIG. 1, with the cap or plate 3 removed so that components inside the substantially sealed unit formed by the actuator frame 2 and the cap 3 are visible.

The actuator mechanism 1 includes two electric motors 9, 10, each provided with a driving shaft 11, 12. The electric motors 9, 10 are implemented, for example, as a direct-current motor with a rotor 9a, 10a, and a stator 9b, 10b set up concentrically around the rotor. Also, the actuator mechanism 1 includes two drive trains 13, 14. A first mirror adjusting element 5 is movable through coupling, via a first drive train 13, to the driving shaft 11 of a first electric motor 9. Similarly, a second mirror adjusting element 6 is movably coupled via a second drive train 14 to the driving shaft 12 of a second electric motor 10. Thus, the mirror adjusting elements 5, 6 may be adjusted in a controlled manner, by operation of the electric motors 9, 10.

The electric motors 9, 10, the drive trains 13, 14 and the mirror adjusting elements 5, 6 are carried by the actuator frame 2. In the embodiment shown, the electric motors 9, 10, the drive trains 13, 14 and the mirror adjusting elements 5, 6 are for the most part in the cup-shaped space of the actuator frame 2 to form a compact design. Furthermore, the driving shafts 11, 12 of the electric motors 9, 10 are bearing-mounted in the actuator frame 2.

The actuator frame 2 has a cup-shaped tray 2a and a number of ribs 2b-v to receive the electric motors 9, 10 and the drive trains 13, 14 in a controlled manner. Thus, the frame 2 has a central rib 2b which forms a partition between the two electric motors 9, 10. Also, the frame 2 has a plurality of locking ribs 2c-j for locking the electric motors 9, 10 in a direction transverse to the axis of symmetry S and the orientation of the respective driving shafts 11, 12 of the electric motors 9, 10. In addition, the frame 2, in the embodiment shown, has two bearing ribs 2k,l; 2m,n per electric motor 9, 10 in which the driving shaft 11, 12 of the respective electric motor 9, 10 is bearing-mounted. To that end, the bearing ribs 2k,l; 2m,n are provided with a recess 2k' which extends to an upper edge 2k'' of the bearing rib so that the driving shaft 11, 12 during assembly can be simply arranged in the bearing recess 2k' for forming a bearing point. Alternatively, the bearing ribs are provided with bearing openings through which the driving shafts 11, 12 extend to form a bearing point. Assembly of the electric motors 9, 10 in the actuator frame 2 can then take place, for example, by applying displaceable or deformable bearing ribs. Furthermore, the frame 2 comprises locking ribs 2p,q for axially locking the driving shafts 11, 12. Also, the frame 2 comprises a plurality of carrying ribs 2r-v which carry a gear, not shown, of the drive train 13, 14.

By application of the cap 3, the components accommodated in the cup shape of the actuator mechanism 1, such as the electric motors and the drive trains, are locked not only in directions transverse to the axis of symmetry S, but also in the direction of the axis of symmetry S itself. Preferably, the actuator frame 2 has a one-piece structure in which the stator and rotor of an electric motor are received so that the position and/or orientation of the stator relative to the rotor can be accurately defined. Thus, the tray 2a and the ribs 2b-v may be manufactured as an integral product, for example in an injection molding process.

It is noted that the structure of the actuator frame ribs 2b-v may be dimensioned in another way and/or may have another geometry. Also, more or fewer ribs may be applied. Furthermore, space between ribs may be wholly or partly filled up, whereby recesses are defined for receiving various components of the actuator mechanism 1, such as the electric motors 9, 10 and the drive trains 13, 14.

In the embodiment shown, the driving shafts 11, 12 are bearing-mounted on both sides of the stator 9b, 10b in bearing ribs 2k,l; 2m,n. In principle, the driving shafts 11, 12 may be bearing-mounted differently, for example, by using more than two bearing points per driving shaft, for example, three or four bearing points, or by having the driving shaft rest on a flat top of a bearing rib. For improved functionality of a bearing point, an ultrasonic welding treatment may be applied and/or an oil or grease lubrication may be arranged.

By bearing-mounting the driving shafts of the electric motors in the actuator frame, the electric motors can be assembled compactly in the frame since bearings in a motor housing are thus redundant, so that less space is needed for the whole of electric motor and actuator frame. Thus, the stator of the electric motor may be implemented without housing. Alternatively, the electric motor is provided with a housing, for example to provide for a flexible design of the actuator frame.

Figure 2B:
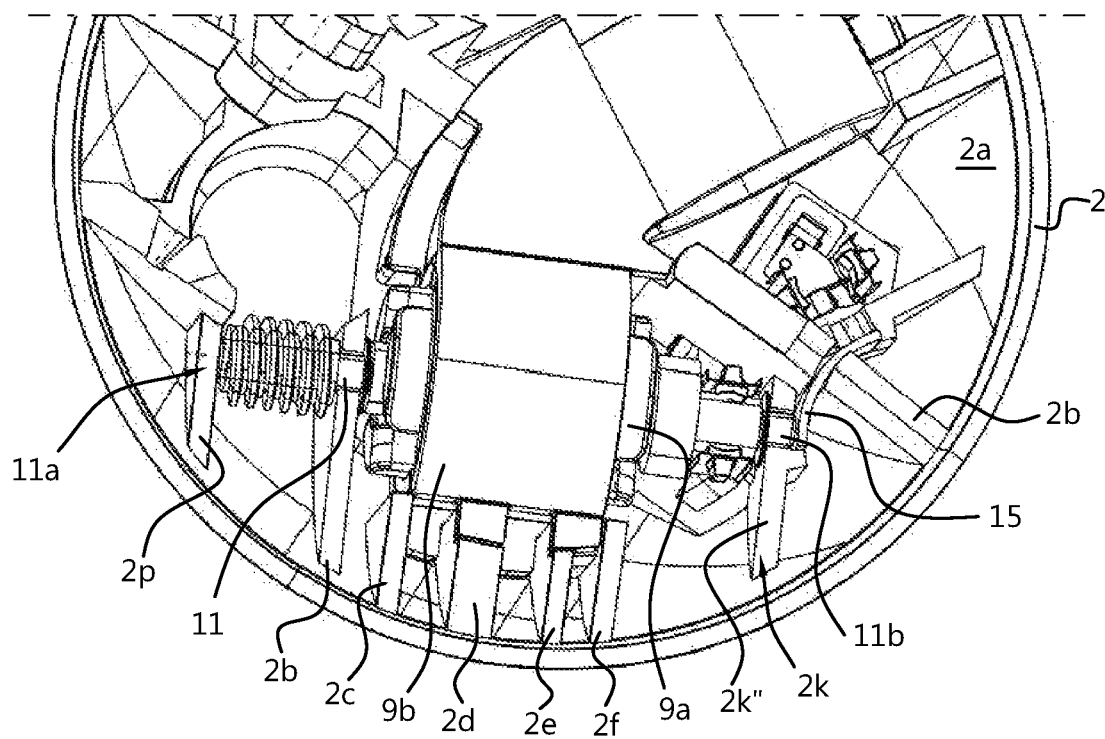
FIG. 2b shows a schematic perspective partial view of the actuator mechanism of FIG. 1 with cap removed.

FIG. 2b shows a schematic perspective partial view of the actuator mechanism of FIG. 1 with cap removed. For ease of reference, the drive trains 13, 14 and also the second electric motor 10 have been removed as well. As shown, the driving shaft 11, 12 is axially locked in the frame 2 by use of a locking rib 2p,q which flatly abuts against a first end 11a, 12a of the shaft 11, 12 and a spring 15 which abuts under a bias against a second end 11b, 12b of the shaft 11, 12, so that a pivot bearing is obtained. Alternatively, an axial locking of the shaft 11, 12 may be realized in a different manner, for example by use of a spring under a bias at both ends of the shaft 11a,b 12a,b.

At the first end 11a, 12a of the driving shafts 11, 12, a coupling element 16, 17 is arranged for coupling with the respective drive train 13, 14. The coupling element 16, 17 in the embodiment shown is configured as a worm which drives a worm wheel 18, 19 of the drive train 13, 14. The worm wheel 18, 19 encloses a cylindrical body 20, 21 which is adjustable in axial direction and in a rotational direction around a cylinder axis of the body 20, 21. The worm wheel 18, 19 is rotation-locked relative to the cylindrical body 20, 21 which is enclosed by the wheel 18, 19. The above-mentioned mirror adjusting elements 5, 6 are connected at an end of a respective cylindrical body 20, 21 or integrated therewith. The radial exterior of the cylindrical body 20, 21 is provided with a worm profile that cooperates with a worm wheel which, in mounted condition of the actuator mechanism 1, extends transversely to both cylindrical bodies 20, 21, supported by the plurality of carrying ribs 2r-v. The respective worm wheels 18, 19, cylindrical bodies 20, 21, and worm wheels not shown form the respective drive trains 13, 14 to which the adjusting elements 5, 6 are respectively coupled.

By rotation of the driving shafts 11, 12, also the coupling elements 16, 17 implemented as worms rotate, which, through cooperation with the worm wheels 18, 19, cause the cylindrical bodies 20, 21 to rotate. Thereupon, the cylindrical bodies 20, 21 adjust in axial direction through cooperation of the worm profiles and the worm wheels not shown, so that the adjusting elements 5, 6 adjust along the respective linear adjustment paths V1, V2. The adjusting elements 5, 6 can be adjusted independently of each other by operation of the respective electric motors 9, 10.

At a second end 11b, 12b of the driving shaft 11, 12, commutator elements are arranged for electrical connection with windings of the respective rotor 9a, 10a, as described below in more detail with reference to FIG. 5.

It is noted that in another embodiment the commutator elements and the coupling element for coupling with the drive train are arranged at the same end of the driving shaft.

In the embodiment shown, the electric motors 9, 10 and hence associated driving shafts 11, 12 are set up non-parallel relative to each other, but mirror symmetrically relative to a plane of symmetry of the cup-shaped frame 2, through the central rib 2b. Here, the distance between the first ends 11a, 12a of the driving shafts 11, 12 is greater than the distance between the second ends 11b, 12b of the driving shafts 11, 12, so that available space at the first ends 11a, 12a can be efficiently utilized by the drive trains 13, 14. Alternatively, the electric motors and the associated driving shafts have a different mutual orientation, for example, parallel to each other or in a non-mirrored setup.

Furthermore, it is noted that the actuator mechanism 1 in the embodiment shown is configured for adjusting a mirror element in two degrees of freedom, by application of two independently functioning electric motors. In principle, however, the actuator mechanism 1 may be provided with only one electric motor which, via a drive train, drives a single adjusting element, for adjustment of a mirror element in only one degree of freedom. Furthermore, the actuator mechanism may contain more than two electric motors, for example, three electric motors, for adjusting a mirror element in three degrees of freedom.

Preferably, the stators 9b, 10b of the electric motors 9, 10 are integrated. Alternatively, the stators of the electric motors are separately formed so that the electric motors are implemented independently of each other, which may be desired from the viewpoint of maintenance.

Figure 3:
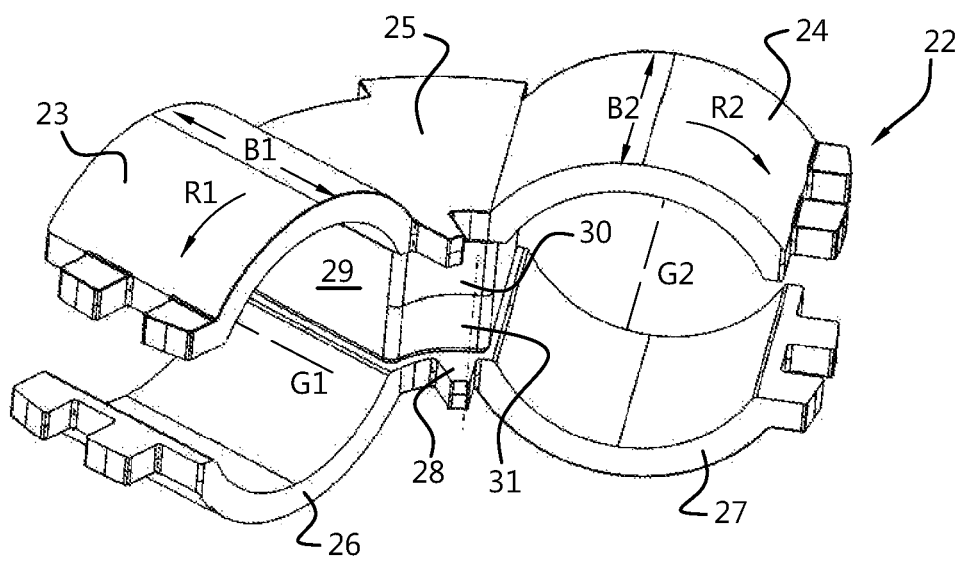
FIG. 3 shows a schematic perspective view of an integrated stator of electric motors in the actuator mechanism as represented in FIG. 1.

FIG. 3 shows a schematic perspective view of an integrated stator 22 of the electric motors in the actuator mechanism as represented in FIG. 1.

The integrated stator 22 has two upper arcuate parts 23, 24 which are connected with each other via an upper intermediate piece 25, and two lower arcuate parts 26, 27 which are connected with each other via a lower intermediate piece 28. The upper and lower intermediate piece 25, 28 are mutually connected by a central part 29 which contains a first and a second permanent magnet 30, 31. In the implementation shown, the mutually opposed terminal ends of the arcuate parts are at a distance from each other. A first upper arcuate part 23 and a first lower arcuate part 26, in mounted condition, is concentric with the geometric axis G1 of the driving shaft 11 of the first electric motor 9. Similarly, a second upper arcuate part 24 and a second lower arcuate part 27, in mounted condition, is concentric with the geometric axis G2 of the driving shaft 12 of the second electric motor 10. Thus, the first upper and lower arcuate part 23, 26 surround the rotor of the first electric motor 9 as a first mantle while the second upper and lower arcuate part 24, 27 surround the rotor of the second electric motor 10 as a second mantle. The arcuate parts 23, 24, 26, 27 and the upper and lower intermediate pieces 25, 28 contain magnetizable material.

By placement of the permanent magnets in the central part 29, between the driving shafts 11, 12, two magnetic loops are formed, viz. through the arcuate parts 23, 26 of the first electric motor 9 and through the arcuate parts 24, 27 of the second electric motor 10. Here, the insight is utilized that the central part 29 is in both loops. Thus, the magnetic flux of the permanent magnets can be efficiently utilized. It is noted that the central part 29 can contain more than two permanent magnets, for example, three or four permanent magnets positioned in series. Also, the central part 29 may contain just one permanent magnet. Also, additional permanent magnets may be used at other positions in the integrated stator 22, for example, between pairs of ends of the upper and lower arcuate parts 23, 26; 24, 27 which are located remote from the central part 29.

Figure 4:
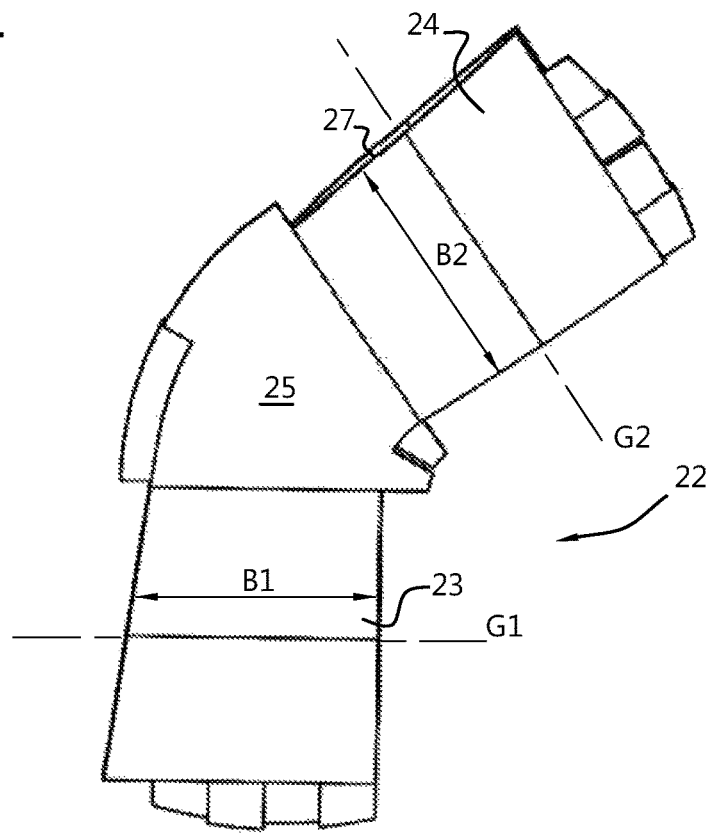
FIG. 4 shows a schematic top plan view of the integrated stator as represented in FIG. 3.

FIG. 4 shows a schematic top plan view of the integrated stator 22 as represented in FIG. 3. The upper arcuate parts 23, 24 which form a part of the respective stator mantle have a width B1, B2 in a direction along the geometric axes G1, G2 of the respective driving shafts 11, 12 of the electric motors. The mantle width B1, B2 mentioned varies in a circumferential direction R1, R2 around the geometric axes G1, G2. Preferably, the mantle width B1, B2 increases in the circumferential direction R1, R2 away from the central part 29, in order to compensate for flux losses.

Figure 5:
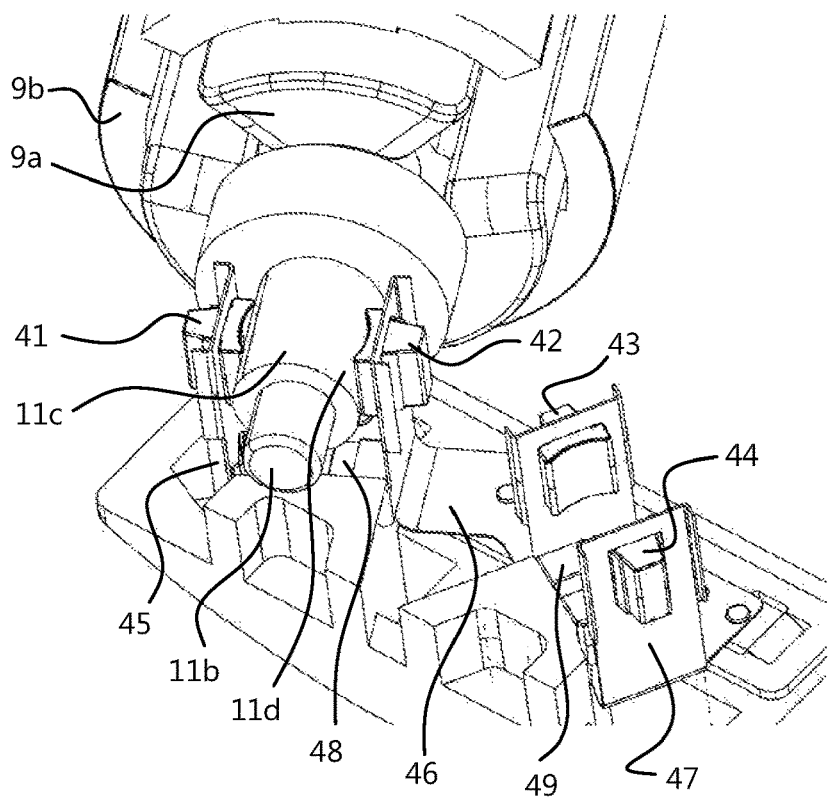
FIG. 5 shows a schematic perspective detail view of a driving shaft end of an electric motor in the actuator mechanism as represented in FIG. 1.

FIG. 5 shows a schematic perspective detail view of a driving shaft end of an electric motor in the actuator mechanism as represented in FIG. 1. In FIG. 5, the rotor 9a and the stator 9b of the first electric motor are represented in part. At the second end 11b of the driving shaft, commutator elements 11c,d are arranged for electric connection of an electric power supply for the electric motor on one side and windings of the rotor 9a on the other. The first electric motor 9 is provided with two electrodes 41, 42 which, mutually diagonally positioned, abut against commutator elements 11c,d of the driving shaft. The electrodes 41, 42 are electrically connected via electrically conductive structures 45, 46 with electric terminals of a power supply controlled by a regulator. Also the second electric motor 10 is provided with two electrodes 43, 44 which, mutually diagonally positioned relative to the driving shaft, abut against commutator elements of the driving shaft. Also the electrodes 43, 44 for the second electric motor 10 are electrically connected via electrically conductive structures 46, 47 with electric terminals of a power supply controlled by a regulator.

In the embodiment shown, one electrode 42 of the two electrodes 41, 42 of the first electric motor 9 is electrically short-circuited with one electrode 43 of the two electrodes 43, 44 of the second electric motor 10. The electrically short-circuited electrodes 42, 43 are electrically connected via the same electrically conductive structure 46 with a single electric terminal, for example, a grounding point. By electrically short-circuiting one electrode 42, 43 at both electric motors 9, 10, only three terminals are needed while the motors can yet be controlled independently. However, each electrode 41, 42, 43, 44 of both electric motors may also be electrically connected with a separate terminal, four terminals in total.

In the embodiment shown, the actuator mechanism furthermore comprises decoupling capacitors 48, 49 which are placed between the two electrodes 41, 42; 43, 44 of each electric motor 9, 10, to decouple the voltages between the two electrodes or suppress interference. In principle, a decoupling capacitor can be used only at one electrode pair 41, 42; 43, 44, or not at all. Furthermore, it is noted that alternatively or additionally, other techniques may be used for interference suppression in respect of the electrodes 41, 42, 43, 44, for example, choke coils, resistors such as a so-called ring resistor or varistors such as a so-called disk varistor between the commutator elements 11c,d.

The invention is not limited to the exemplary embodiments represented here.

Thus, the actuator frame 2 may be detachably or permanently included in a housing, for example, rigidly or pivotally. Also, the actuator frame 2 may, instead of the cup shape shown, have a different geometry, for example, a box shape or a plate form. If desired, the actuator frame 2 may be integrated with a housing or be implemented without housing.

Many variants are possible and will be clear to those skilled in the art within the scope of the appended claims.

In the context of a clear and concise description, the features have been described as part of the same or discrete embodiments. However, the scope of protection can include embodiments with combinations of any or all of the features described.

The invention claimed is:

1. An actuator mechanism for adjusting the orientation of a mirror element in an exterior mirror unit of a vehicle, comprising
    a first electric motor with a first driving shaft, a first drive train, and a first movable mirror adjusting element coupled via the first drive train to the first driving shaft of the first electric motor;
    a second electric motor with a second driving shaft, a second drive train, and a second movable mirror adjusting element coupled via the second drive train to the second driving shaft of the second electric motor for adjusting the mirror element in a second degree of freedom; and
    an actuator frame, wherein
    the actuator frame carries the first electric motor, the first drive train and the first mirror adjusting element,
    the first driving shaft of the first electric motor is bearing-mounted in the actuator frame, and
    the second driving shaft of the second electric motor is bearing-mounted in the actuator frame.

2. The actuator mechanism according to claim 1, wherein the actuator frame is provided with a single or a plurality of ribs in which the first driving shaft of the first electric motor and the second driving shaft of the second electromotor are bearing-mounted.

3. The actuator mechanism according to claim 1, wherein at a first end of the first driving shaft a coupling element for coupling with the first drive train is arranged and at a second end of the first driving shaft first commutator elements for electrical connection with windings of a rotor of the first electric motor are arranged, and
    at a first end of the second driving shaft a coupling element for coupling with the second drive train is arranged and at a second end of the second driving shaft second commutator elements for electrical connection with windings of a rotor of the second electric motor are arranged.

4. The actuator mechanism according to claim 1, wherein the first driving shaft and the second driving shaft are axially locked in the actuator frame.

5. The actuator mechanism according to claim 1, wherein a stator of the first electric motor and a stator of the second electric motor are set up concentrically around the rotor.

6. The actuator mechanism according to claim 5, wherein the actuator frame comprises a one-piece structure in which the stator and the rotor of the first electric motor are received, and in which the stator and the rotor of the second electric motor are received.

7. The actuator mechanism according to claim 1, wherein the first driving shaft of the first electric motor and the second driving shaft of the second electric motor are set up non-parallel.

8. The actuator mechanism according to claim 1, wherein the first electric motor and the second electric motor are set up mirror-symmetrically.

9. The actuator mechanism according to claim 1, wherein a distance between the first end of the first driving shaft and a first end of the second driving shaft is greater than a distance between the second end of the second driving shaft and a second end of the second driving shaft.

10. The actuator mechanism according to claim 1, wherein the stator of the first electric motor and a stator of the second electric motor are integrated, forming an integrated stator.

11. The actuator mechanism according to claim 10, wherein the integrated stator comprises at least a permanent magnet which is placed between the first driving shaft of the first electric motor and the second driving shaft of the second electric motor.

12. The actuator mechanism according to claim 10, wherein the integrated stator comprises a first mantle with magnetizable material, which surrounds the rotor of the first electric motor and a second mantle with magnetizable material which surrounds a rotor of the second electric motor.

13. The actuator mechanism according to claim 12, wherein a width of the first mantle in a direction along the first driving shaft of the first electric motor and a width of the second mantle in a direction along the second driving shaft of the second electric motor vary in a circumferential direction around the rotor of the first electric motor and the rotor of the second electric motor, respectively.

14. The actuator mechanism according to claim 1, wherein the first electric motor and the second electric motor are each provided with two electrodes mutually diagonally positioned, which abut against first commutator elements and second commutator elements of the first driving shaft and the second driving shaft, respectively, and wherein one of the two electrodes of the first electric motor is electrically short-circuited with one of the two electrodes of the second electric motor.

15. The actuator mechanism according to claim 14, furthermore comprising a first decoupling capacitor, which is placed between the two electrodes of the first electric motor and a second decoupling capacitor, which is placed between the two electrodes of the second electric motor.

16. The actuator mechanism according to claim 1, wherein the actuator frame is detachably arranged in a cup-shaped housing.

\* \* \* \* \*